United States Patent
Chandrashekar et al.

(10) Patent No.: US 11,611,807 B2
(45) Date of Patent: Mar. 21, 2023

(54) CONTENT-BASED USER-PREFERRED TRICK PLAY

(71) Applicant: Rovi Guides, Inc., San Jose, CA (US)

(72) Inventors: Padmassri Chandrashekar, Karnataka (IN); Daina Emmanuel, Bangalore (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/363,284

(22) Filed: Jun. 30, 2021

(65) Prior Publication Data

US 2023/0007362 A1 Jan. 5, 2023

(51) Int. Cl.
*H04N 21/6587* (2011.01)
*H04N 21/45* (2011.01)
*H04N 21/482* (2011.01)
*H04N 21/845* (2011.01)

(52) U.S. Cl.
CPC ..... *H04N 21/6587* (2013.01); *H04N 21/4532* (2013.01); *H04N 21/4825* (2013.01); *H04N 21/8455* (2013.01)

(58) Field of Classification Search
CPC .......... H04N 21/6587; H04N 21/4532; H04N 21/4825; H04N 21/8455; H04N 7/00
See application file for complete search history.

(56) References Cited

U.S. PATENT DOCUMENTS

| 7,761,892 | B2 | 7/2010 | Ellis et al. |
| 2010/0172626 | A1* | 7/2010 | Lee .......................... H04N 7/00 |
| 2013/0031266 | A1* | 1/2013 | Gilson .................... G06F 15/16 |

* cited by examiner

*Primary Examiner* — Anthony Bantamoi
(74) *Attorney, Agent, or Firm* — Haley Guiliano LLP

(57) ABSTRACT

The present disclosure relates to a method for enabling user-preferred trick-play modes. More particularly, the present disclosure provides a method for enabling user-preferred trick-play modes based on content classifications of a content item. In embodiments described herein, methods and systems are provided for varying the user experience with respect to trick-play operation. For example, experience may be varied based on the content being consumed or based on a combination of content being consumed and computing device being used.

17 Claims, 10 Drawing Sheets

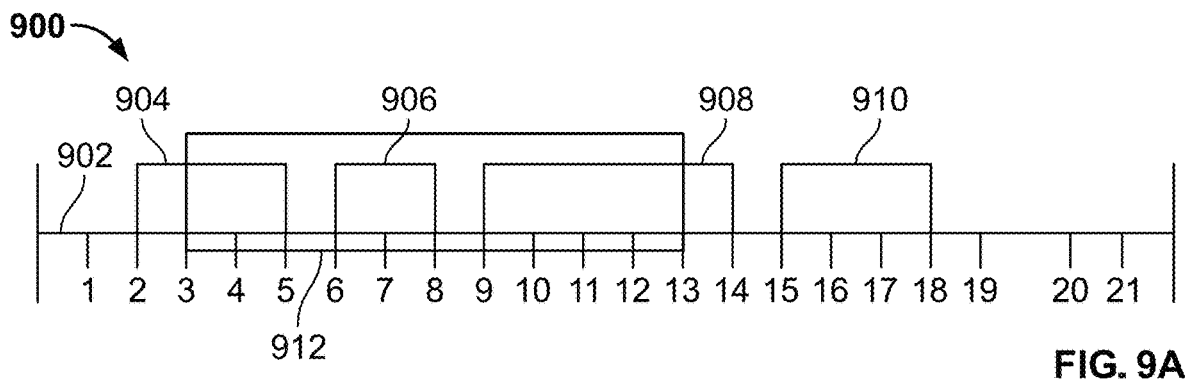

CONTENT-BASED USER-PREFERRED TRICK PLAY

FIELD

The present disclosure relates to a method for enabling user-preferred trick-play mode. More particularly, the present disclosure provides a method for enabling user-preferred trick-play mode based at least on attributes of a content item.

BACKGROUND

Consuming content using trick-play mode, e.g., at faster or slower speeds than normal playback speed, can be seen widely among content consumers. Most content platforms, e.g., YouTube, Netflix, etc., provide trick-play experiences for content consumers. For example, today, users can fast-forward, skip through segments, jump to specific chapters (if chapter metadata is available), play the video at a faster speed, e.g., 1.5×, 2×, etc., or play the video at a slower speed, e.g., 0.75×. Typically, conventional trick-play modes are made available on content platforms in a unified manner, resulting in a singular user experience, with the same trick-play mode applied for all the types of content, regardless of content type or genre, for example. Many video OTT services, e.g., Netflix, and video-sharing platforms, e.g., YouTube, seek to provide users with a personalized experience and control over the content, e.g., on-demand or pre-recorded content, consumed by users.

While conventional trick-play modes provide users with visual feedback, e.g., the low resolution frames or thumbnails of the content item, as the content is subjected to a trick-play operation, there is typically no indication of context around attributes of the content item, or segments, that is subjected to the trick-play operation. Thus, it may be beneficial for a user to experience different trick-play modes based on the content being consumed by the user. Furthermore, the user may wish to experience personalized trick-play modes based on the content being consumed. Thus, in view of the foregoing, methods and systems are disclosed herein for enabling user-preferred trick-play modes based on the attributes of content items and user preferences with respect to trick-play modes.

SUMMARY

According to a first aspect, a method is provided for presenting a content item using one or more trick-play modes. The method comprises a step of receiving a master playlist for a content item comprising a plurality of segments, the master playlist comprising trick-play mode identifiers associated with corresponding segment identifiers (e.g., references via URLs to individual content item segments). The method further comprises a step of determining, based on the trick-play mode identifiers and the corresponding segment identifiers, respective trick-play modes made available for the segments based on at least one of a user preference or attributes of the segments and a step of generating the segments of the content item for presentation at a computing device by using the respective determined trick-play modes.

In some embodiments, the trick-play mode identifiers comprise any one or more of seek-based trick-play mode identifier; hop-based trick-play mode identifier; frame-based trick-play mode identifier; and thumbnail-based trick-play mode identifier.

In some embodiments, the respective trick-play modes are made available for the segments further based on metadata associated with the content item. In some embodiments, the metadata associated with the content item comprises timed-text data.

In some embodiments, the trick-play mode identifiers are made available for the segments further based on the computing device. In some embodiments, the user preference is determined based on user profile information.

In some embodiments, the master playlist comprises at least a video playlist (e.g., one or more reference URLs) comprising one or more bitrate variants, further wherein the one or more bitrate variants comprise the segment identifiers for the plurality of segments of the content item. In some embodiments, the respective trick-play modes are made available for the segments further based on the one or more bitrate variants of the video playlist.

In some embodiments, the attributes of the segments are associated with any one or a combination of genre, topic, length, and/or parental rating.

According to a second aspect, a non-transitory, computer-readable medium is provided having instructions encoded thereon for carrying out a method according to the method of the first aspect.

According to a third aspect, a system is provided for presenting a content item using one or more trick-play modes. The system comprises input circuitry configured to receive a command for performing trick-play operations and control circuitry. The control circuitry may be configured to receive a master playlist for a content item comprising a plurality of segments, the master playlist comprising trick-play mode identifiers associated with corresponding segment identifiers; determine, based on the trick-play mode identifiers and the corresponding segment identifiers, respective trick-play modes made available for the segments based on at least one of a user preference or attributes of the segments; and generate the segments of the content item for presentation at a computing device by using the respective determined trick-play modes.

According to a further aspect, a non-transitory computer-readable is provided medium having instructions encoded thereon. The instructions comprise instructions to receive a master playlist for a content item comprising a plurality of segments, the master playlist comprising trick-play mode identifiers associated with corresponding segment identifiers; determine, based on the trick-play mode identifiers and the corresponding segment identifiers, respective trick-play modes made available for the segments based on at least one of a user preference or attributes of the segments; and generate the segments of the content item for presentation at a computing device by using the respective determined trick-play modes.

It will be appreciated that other features, aspects and variations of the present disclosure will be apparent from the drawings and detailed description. Additionally, it will be further appreciated that additional or alternative embodiments may be implemented within the principles set out by the present disclosure.

BRIEF DESCRIPTION OF THE DRAWINGS

The above and other objects and advantages of the disclosure will be apparent upon consideration of the following detailed description, taken in conjunction with the accompanying drawings, in which:

FIG. 9A shows a timeline of segments of a content item and a moving window encompassing segments that will be subjected to a trick-play operation, in accordance with some embodiments of the present disclosure;

FIG. 9B shows an example of metadata describing segments of the content item of FIG. 9A, in accordance with some embodiments of the present disclosure;

FIG. 9C shows another example of metadata describing segments of the content item and user preference data, in accordance with some embodiments of the present disclosure.

Figure 1:
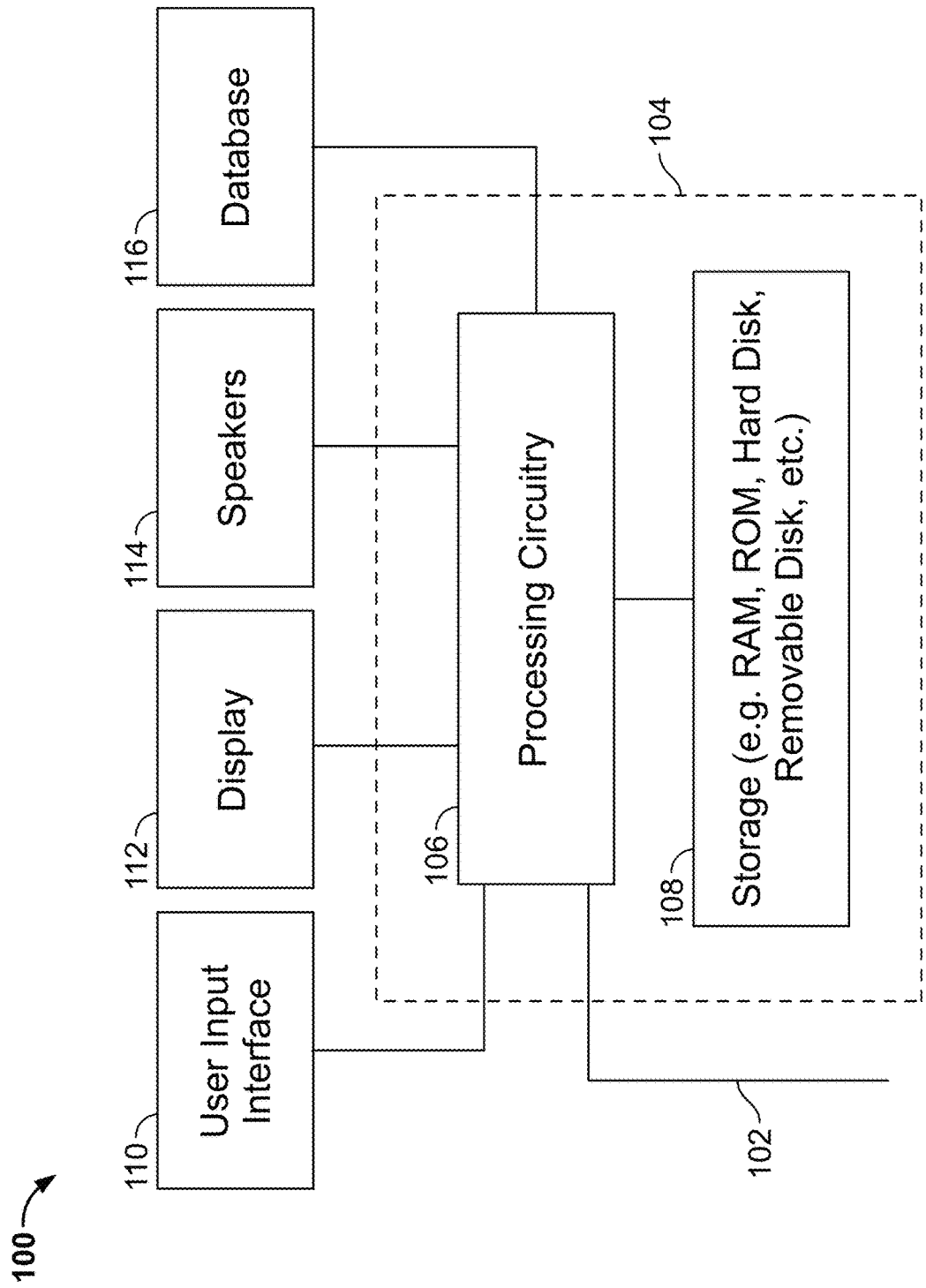
FIG. 1 shows an illustrative depiction of an example computing device, in accordance with some embodiments of the present disclosure.

The figures herein depict various embodiments for purposes of illustration only. It will be appreciated that additional or alternative structures, systems and methods may be implemented within the principles set out by the present disclosure.

DETAILED DESCRIPTION

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and "media content" should be understood to mean an electronically consumable user asset, such as a live televised program, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrases "user equipment device," "user equipment," "user device," "electronic device," "electronic equipment," "media equipment device," "computing device," "client device," "user device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (I/O) path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client/server-based embodiments, control circuitry 104 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths (which are described in more detail in connection with FIG. 2). In addition, communications circuitry may include circuitry that enables peer-to-peer communication of user equipment devices, or communication of user equipment devices in locations remote from each other.

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorder, or PVRs), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touchscreen, touchpad, stylus input, joystick, voice recognition interface, or other user input interfaces.

Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be standalone units. The audio component of videos and other content displayed on display 112 may be played through speakers 114. In some embodiments, the audio may be distributed to a receiver (not shown), which processes and outputs the audio via speakers 114. User equipment device 100 may also incorporate or be accessible to one or more other modules 116, for example, a content database 116 for storing content metadata.

The media guidance application may be implemented using any suitable architecture. For example, it may be a stand-alone application wholly implemented on user equipment device 100. In such an approach, instructions for the application are stored locally (e.g., in storage 108), and data for use by the application is downloaded on a periodic basis (e.g., from an out-of-band feed, from an Internet resource, or using another suitable approach). Control circuitry 104 may retrieve instructions for the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client/server-based application. Data for use by a thick or thin client implemented on user equipment device 100 is retrieved on demand by issuing requests to a server remote from the user equipment device 100. In one example of a client/server-based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves using a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
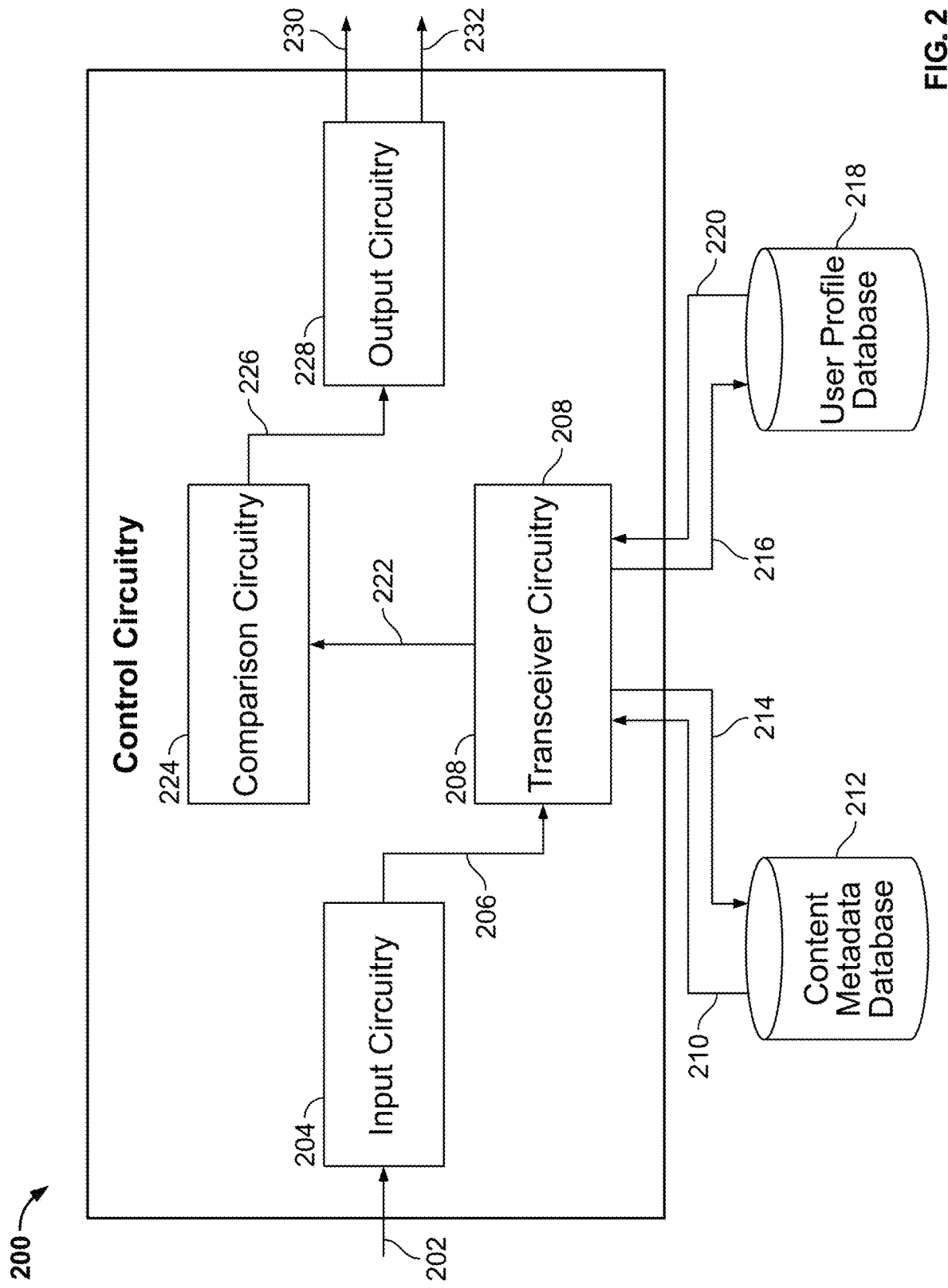
FIG. 2 shows an illustrative depiction of an example control circuitry for a computing device, in accordance with some embodiments of the present disclosure.

FIG. 2 is a block diagram showing components and data flow therebetween of an exemplary system for selectively playing back portions of audio of a content item, in accordance with some embodiments of the disclosure. Control circuitry 200 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 200 receives 202, using input circuitry 204, a command to perform a trick-play operation. Input circuitry 204 may include a microphone and voice processing circuitry for receiving voice commands, infrared receiving circuitry for receiving commands from a remote control device, a touchscreen interface for receiving user interactions with graphical user interface elements, or any combination thereof or any other suitable input circuitry for receiving any other suitable user input. In response to the command, input circuitry 204 generates a query for metadata of the content item and transmits 206 the query to transceiver circuitry 208 to be transmitted 214 to content metadata database 212. The query may be an SQL "SELECT" command, or any other suitable query format.

Transceiver circuitry 208 may be a network connection such as an Ethernet port, Wi-Fi module, or any other data connection suitable for communicating with a remote server. Transceiver circuitry 208 receives 210 from content metadata database 212, in response to the query, metadata describing segments of the content item. In some embodiments, input circuitry 204 also generates a second query for user preference data. Transceiver circuitry 208 transmits 216 the second query to user profile database 218 and receives 220 from user profile database 218, in response to the query, user preference data.

Transceiver circuitry 208 transfers 222 the metadata to comparison circuitry 224. Comparison circuitry 224 identifies the segments of the content item that will be subjected to the trick-play operation and may analyze importance levels of audio, textual description or image frames to select for presentation during the trick-play operation. Comparison circuitry 224 may also receive, or have access to, the current playback position and the length of moving window 912. Once the audio, textual description or image frames have been selected, comparison circuitry 224 transfers 226 the identifiers corresponding to the segments to output circuitry 228. Output circuitry 228 may decrease/increase the speed of video output 230 and, using the identifiers of the segments of the content item, outputs 232 of portions of the content item.

Figure 3:
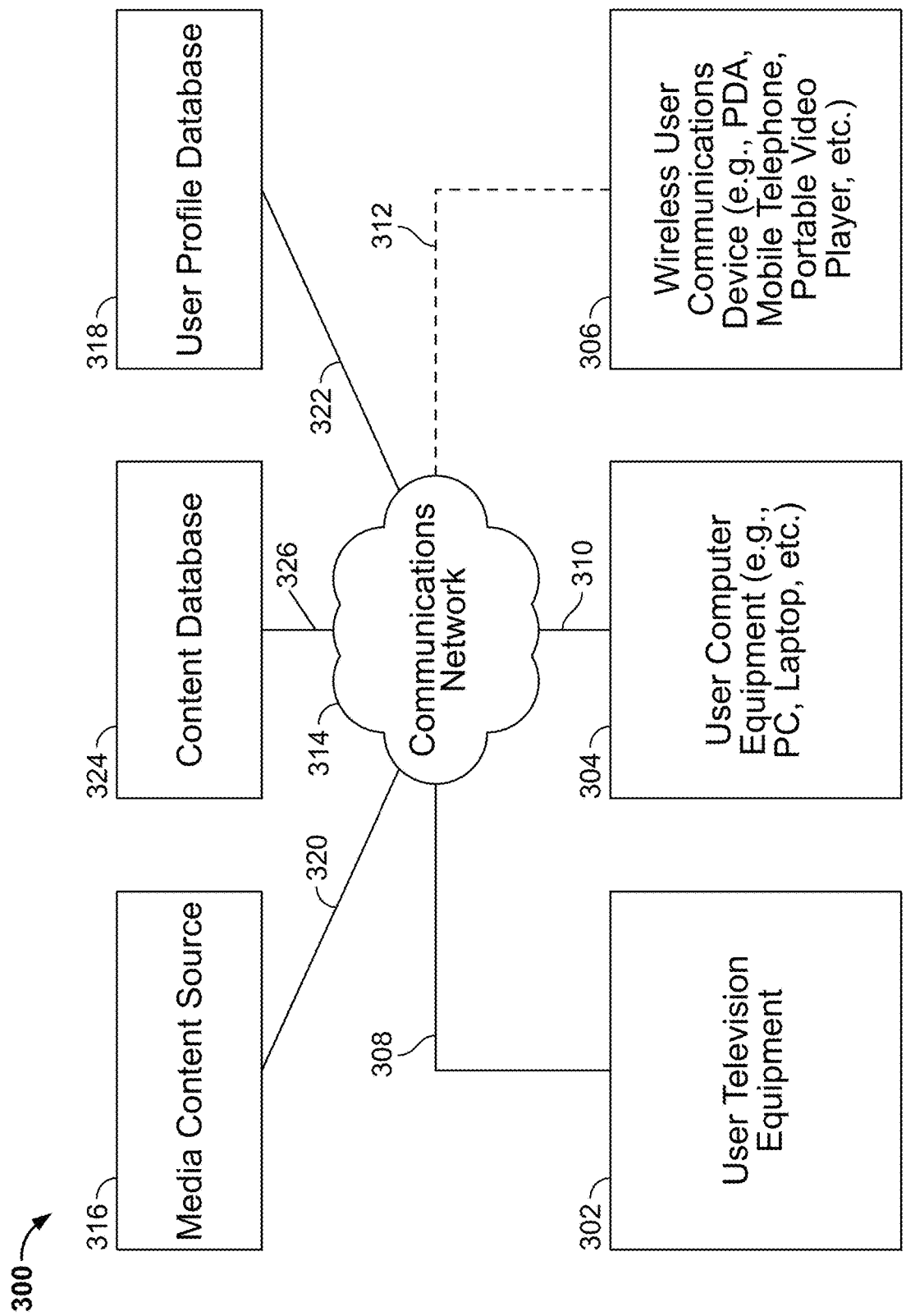
FIG. 3 shows a block diagram of an illustrative user equipment system, in accordance with some embodiments of the present disclosure.

User equipment device 100 of FIG. 1 can be implemented in system 300 of FIG. 3 as user television equipment 302, user computer equipment 304, wireless user communications device 306, or any other type of user equipment suitable for accessing content. For simplicity, these devices may be referred to herein collectively as "user equipment" or "user equipment devices," and may be substantially similar to user equipment devices described above. A user equipment device, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 1 may not be classified solely as user television equipment 302, user computer equipment 304, or a wireless user communications device 306. For example, user television equipment 302 may, like some user computer equipment 304, be Internet-enabled, allowing for access to Internet content, while user computer equipment 304 may, like some television equipment 302, include a tuner, allowing for access to television programming. The media guidance application may have the same layout on various different types of user equipment or may be tailored to the display capabilities of the user equipment. For example, on user computer equipment 304, the guidance application may be provided as a website accessed by a web browser. In another example, the guidance application may be scaled down for wireless user communications devices 306.

In system 300, there may be more than one of each type of user equipment device but only one of each is shown in FIG. 3 to avoid overcomplicating the drawing. In addition, each user may utilize more than one type of user equipment device and also more than one of each type of user equipment device. In some embodiments, a user equipment device (e.g., user television equipment 302, user computer equipment 304, or wireless user communications device 306) may be referred to as a "second screen device" or "secondary device."

The user may also set various settings to maintain consistent media guidance application settings, e.g., volume settings, across in-home devices and remote devices. Settings include programming preferences that the guidance application utilizes to make programming recommendations, display preferences, and other desirable guidance settings. For example, if a user sets a preferred volume level as a favorite volume level on, for example, a website mobile phone, the same settings would appear on the user's in-home devices (e.g., user television equipment and user computer equipment), if desired. Therefore, changes made on one user equipment device can change the guidance experience on another user equipment device, regardless of whether they are the same or a different type of user equipment device.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 312 is drawn with a dotted line to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communications paths, such as those described above in connection with paths 308, 310, and 312, as well as other short-range point-to-point communications paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes media content source 316, content database 324 and user profile database 318 coupled to communications network 314 via communications paths 320, 326, and 322, respectively. Paths 320, 326, and 322 may include any of the communications paths described above in connection with paths 308, 310, and 312. Communications may be exchanged over one or more communications paths, but are shown as a single path in FIG. 3 to avoid overcomplicating the drawing. In addition, there may be more than one of each of media content source 316, content database 324 and user profile database 318, but only one of each is shown in FIG. 3 to avoid overcomplicating the drawing. (The different types of each of these sources are discussed below.) If desired, media content source 316, content database 324 and user profile database 318 may be integrated as one module. Although communications between sources 316, 324 and 318 with user equipment devices 302, 304, and 306 are shown as through communications network 314, in some embodiments, sources 316, 324, and 318 may communicate directly with user equipment devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content, and providing remotely stored content to user equipment, are discussed in greater detail in connection with Ellis et al., U.S. Pat. No. 7,761,892, issued Jul. 20, 2010, which is hereby incorporated by reference herein in its entirety.

A media guidance data source may also be provided that provides media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, an out-of-band digital signal, or any other suitable data transmission technique. Program schedule data and other media guidance data may be provided to user equipment on multiple analog or digital television channels.

Media guidance applications may be, for example, stand-alone applications implemented on user equipment devices. For example, the media guidance application may be implemented as software or a set of executable instructions, which may be stored in storage 108 and executed by control circuitry 104 of a user equipment device 100. In some embodiments, media guidance applications may be client/server applications where only a client application resides on the user equipment device, and server application resides on a remote server. For example, media guidance applications may be implemented partially as a client application on control circuitry 104 of user equipment device 100 and partially on a remote server as a server application running on control circuitry of the remote server (not separately shown in FIG. 1). When executed by control circuitry of the remote server, the media guidance application may instruct the control circuitry to generate the guidance application displays and transmit the generated displays to the user equipment devices.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc.; Netflix is a trademark owned by Netflix Inc.; and Hulu is a trademark owned by Hulu, LLC. In addition to content and/or media guidance data, providers of OTT content can distribute media guidance applications (e.g., web-based applications or cloud-based applications), or the content can be displayed by media guidance applications stored on the user equipment device.

Media guidance system 300 is intended to illustrate various approaches, or network configurations, by which user equipment devices and sources of content and guidance data may communicate with each other for the purpose of accessing content and providing media guidance. The embodiments described herein may be applied in any approach that does not deviate from the teachings of this disclosure, for example in a system employing an approach for delivering content and providing media guidance.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources and one or more media guidance data sources and one or more databases. In addition or in the alternative, the remote computing sites may include other user equipment devices, such as user television equipment 302, user computer equipment 304, and wireless user communications device 306. For example, the other user equipment devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

Cloud resources may be accessed by a user equipment device using, for example, a web browser, a media guidance application, a desktop application, a mobile application, and/or any combination of access applications. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1 and FIG. 2.

Various trick-play mode identifiers are available in conventional systems. Typically, a dedicated trick-play mode is commonly defined by content platforms or based on content devices. Some examples of trick-play modes currently available to users include, for example, seek-based trick-play mode, hop-based trick-play mode, frame-based trick-play mode and thumbnail-based trick-play mode.

In a seek-based approach, as the user commands, e.g., via a user interface, a trick-play operation, the image frame of the content item is moved to a predetermined position in the content item being consumed. For example, the video playlist of the content item may jump every 20 seconds during a fast-forward operation, displaying the respective image frame of the content item during the trick-play operation. In a hop-based approach, as the user commands the trick-play operation, the image frame of the video playlist at a current playback position is maintained, e.g., as a still image, and the time bar is moved during the trick-play operation. In a frame-based approach, as the user commands the trick-play operation, subsequent image frames of the content item are displayed at predefined intervals, e.g., using I-frames, during the trick-play operation. In a thumbnail-based approach, as the user commands the trick-play operation, smaller resolution frames of the content item are generated and made available for display for the user during the trick-play operation. It will be appreciated that other forms of trick-play modes may also be available to the user. Furthermore, enhanced trick-play modes may also be available to the user, which will be described in detail below.

Many video OTT service platforms, e.g., Netflix, and video-sharing platforms, e.g., YouTube, provide users with control over the content, e.g., on-demand content or prerecorded content, being consumed by the user. For example, users may skip scenes or segments, jump to specific chapters (if chapter metadata is available), play the video at a faster speed by fast-forwarding the content, e.g., 1.5×, 2×, etc., or play the video at a slower speed, e.g., 0.75×.

Typically, one of the above-mentioned trick-play modes is made available for a content item resulting in a unified user experience, with the trick-play mode being applied to all content types provided by a content platform or video-sharing platform, for example. While conventionally trick-play modes provide users with visual feedback, e.g., the low-resolution frames or thumbnails of the content item, as the content is subjected to a trick-play operation, there is typically no indication of context around attributes of the content item or segments that are subjected to the trick-play operation. Thus, it may be beneficial for a user to experience different trick-play modes based on the content being consumed by the user.

In view of the foregoing, the present disclosure proposes a method for enabling user-preferred trick-play mode based at least on attributes of a content item. In example embodiments, methods and systems are provided for varying the user experience with respect to trick-play operation. For example, the user experience may vary based on attributes of the content being consumed or based on a combination of content and computing device. For example, for educational content, or other conversation-based content, the user may wish to experience seek-based trick play, as it may be unnecessary to go through every frame during trick-play operation. In another example, for sports content, or other fast-paced content, the user may wish to experience thumbnail-based trick-play mode as the user may wish to visually experience the flow of the content even during trick-play operation.

In some embodiments, the system may determine, at a server, for a content item comprising a plurality of segments, content attributes, e.g., a content classification, associated with the content item or associated with each of the segments of the content item. For example, content attributes may be associated with the genre, topic, length, and/or parental rating associated with the content item, or segments thereof. In some embodiments, the system may determine content attributes based on content identification or image analysis, for example. In some embodiments, the system may determine content attributes associated with each of the segments based on metadata available for each of the segments. For example, metadata of scenes may be readily available, e.g., via dedicated JSON files, or generated in substantially realtime based on content identification or image analysis, e.g., analysis of frames in an I-frame playlist or the full frames of the content item. Typically, full frames comprise more metadata associated with the content item, enabling analysis of image frames as well as audio segments, for example. Similarly, in some embodiments, the content item or segments of the content item may be summarized based on parsing the closed caption text, or other timed-text data.

In some embodiments, the system may determine, at the server, a trick-play mode for the content item. In some embodiments, the system may determine, at the server, trick-play modes for segments of the content item. In some embodiments, the trick-play modes may be any of seek-based trick-play mode, hop-based trick-play mode, frame-based trick-play mode, or thumbnail-based trick-play mode. It will be appreciated that any other suitable trick-play mode may also be available for the user based on attributes of the content item.

In some embodiments, trick-play modes may be determined based at least on the content attributes. In some embodiments, trick-play modes may be determined further or solely based on a user preference of one or more trick-play modes, e.g., based on attributes of content items. For example, user preferences may be determined based on user profile information. For example, the user may provide, manually, an indication, e.g., via user preference settings, that thumbnail-based trick-play mode be made available for sports content regardless of the device type used for consuming the content. In another example, the user may indicate that thumbnail-based trick-play mode is preferred for all sports content and that frame-based trick-play mode is preferred for all other types of content, for example. In yet another example, the user may indicate a preference to consume horror films in trick-play mode being a seek-based trick-play mode and animation films in trick-play mode being a thumbnail-based trick-play mode.

In some embodiments, trick-play modes may be determined further based on metadata associated with the content item. For example, the metadata associated with the content item may be closed-caption text or other timed-text data.

In some embodiments, trick-play modes are determined further based on the user device. For example, as well as by content attributes or segment attributes, trick-play modes may be determined further based on the size of the computing device. For example, a sports content item being consumed on a 4K TV may be associated with thumbnail-based trick-play mode, whereas the same sports content item being consumed on a mobile phone may be provided with frame-based trick-play mode, as thumbnail-based trick-play mode may be redundant due to the screen size of the mobile device, for example.

Figure 4:
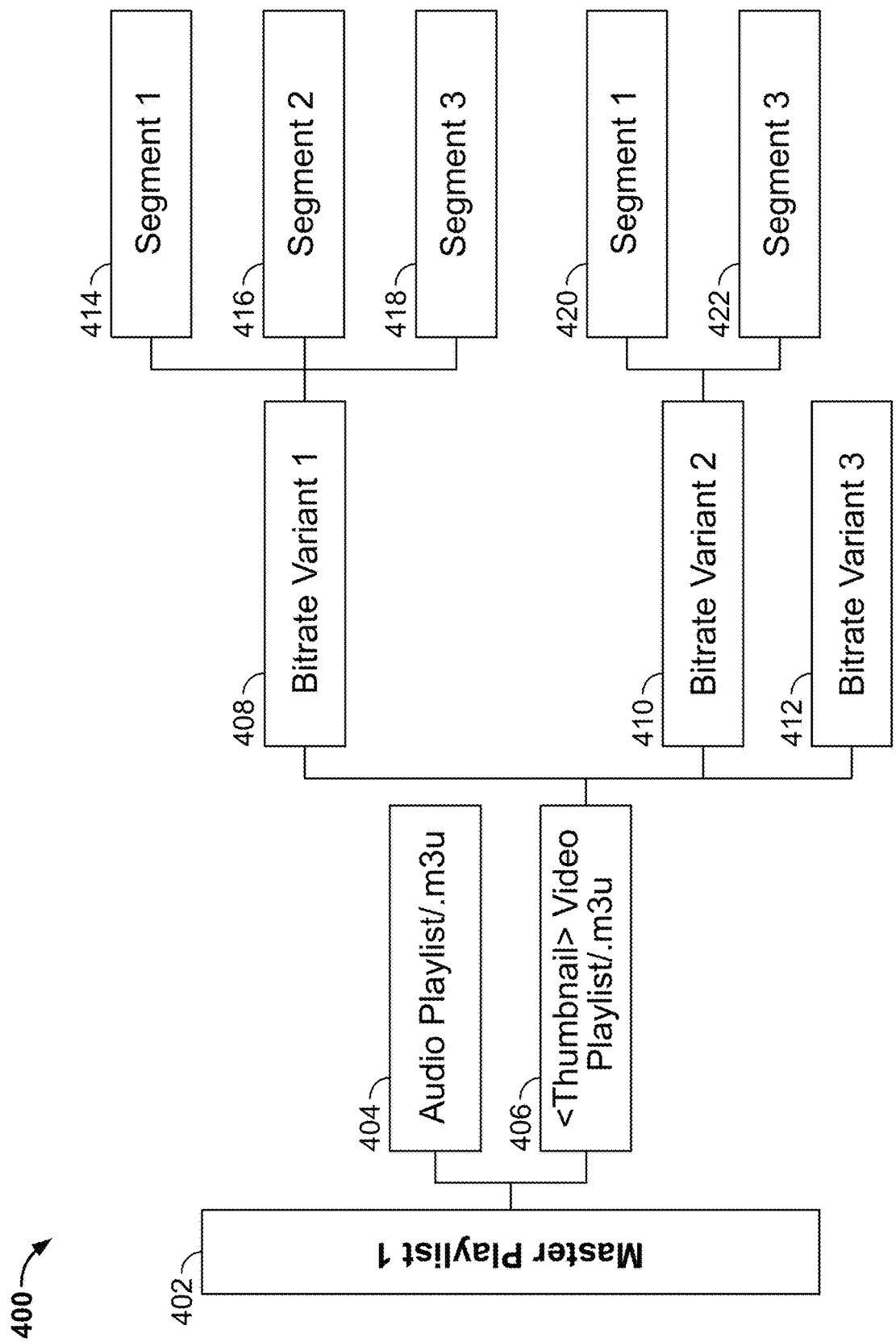
FIG. 4 shows an illustration of an example master playlist for a content item having a trick-play mode associated with a video playlist of the master playlist, in accordance with some embodiments of the present disclosure.

FIG. 4 shows an illustration of an example master playlist, master playlist 1, 402, for a content item having a trick-play mode associated with a video playlist of the master playlist, in accordance with some embodiments of the present disclosure. In some embodiments, the master playlist comprises at least a video playlist 406 comprising one or more bitrate variants, such as bitrate variants 408, 410, and 412. In some embodiments, the master playlist may further comprise an audio playlist 404. Furthermore, the one or more bitrate variants, 408, 410, and 412, may comprise video playlist segments or segment identifiers, such as segment identifiers 414, 416, 418, 420, 422 for each segment of the content item. In some embodiments, a trick-play mode identifier may be associated with the video playlist of the master playlist. In order to provide users with different trick-play modes for different content items based on their content attributes, a master playlist may be provided comprising the trick-play mode identifier for that content item, as shown in FIG. 4.

Figure 5:
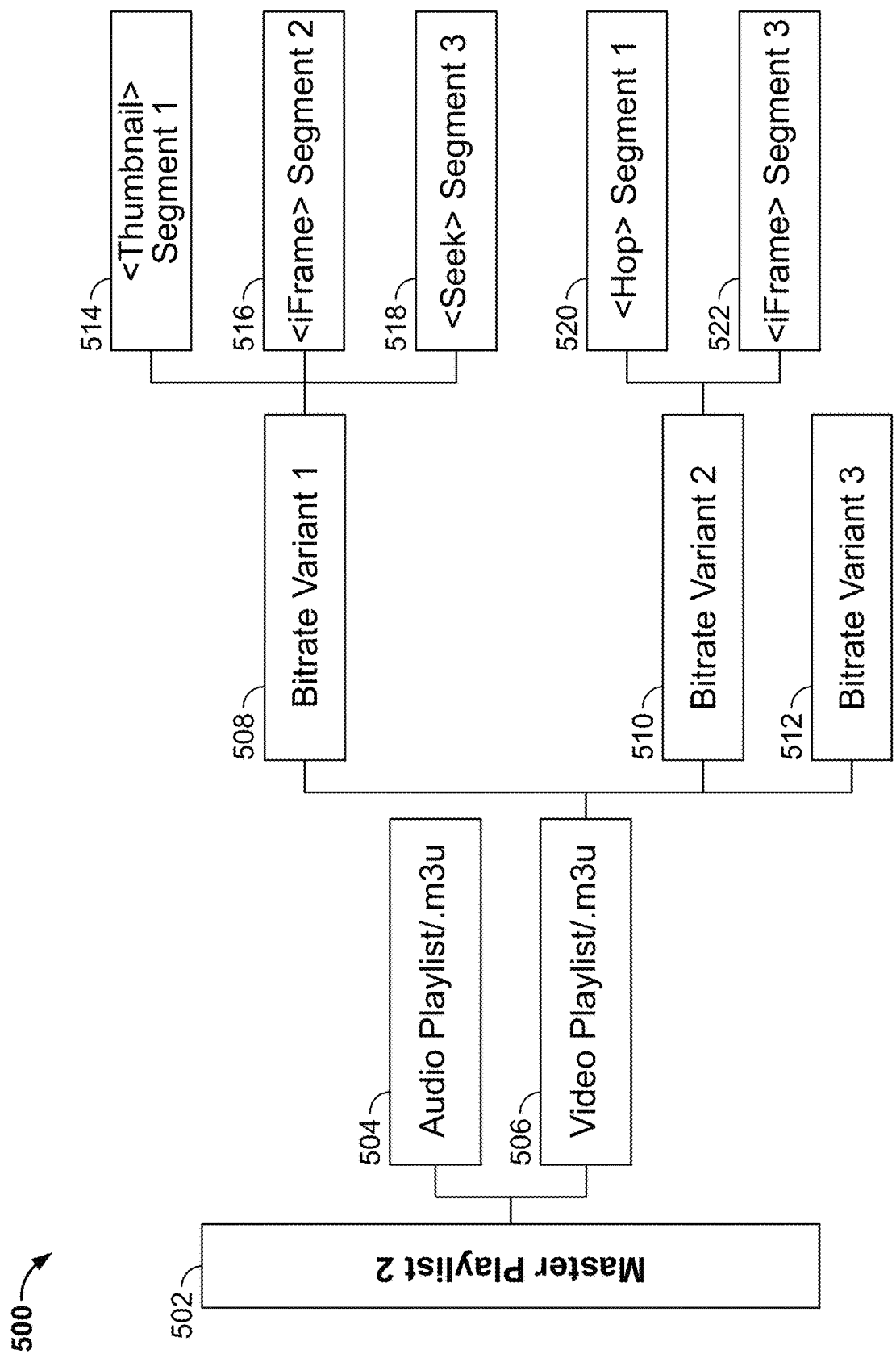
FIG. 5 shows an illustration of an example master playlist for a content item having a trick-play mode associated with video playlist segments of each bitrate variant of the video playlist, in accordance with some embodiments of the present disclosure.

FIG. 5 shows an illustration of an example master playlist, master playlist 2, 502, for a content item having trick-play mode identifiers associated with segment identifiers, such as segment identifiers 514, 516, 518, 520, 522, of each bitrate variant of the video playlist, such as bitrate variants 508, 510, 512, in accordance with some embodiments of the present disclosure. For example, in some embodiments, a trick-play mode may be made available for each segment identifier of a master playlist. In some examples, although different content items may be provided with different playlists of trick modes, based on the determined attributes of each content item, each content item may also be provided with varying trick modes. For example, a content item may be provided with different trick-modes based on the bitrate variant of the master playlist. In another example, a content item may contain different types of content, e.g., a soccer match comprising two halves of the match and a half-time panel interview with hosts of a particular program. In such an example, the content item may be provided with different types of trick modes for the different portions or segments of the content item, as shown in FIG. 5.

For example, when a user consumes a recording of a soccer match, the user may wish to experience a thumbnail-based trick-play operation for the first and second halves of the soccer match since they are fast-paced. On the other hand, during the half-time interval of the soccer match, as the content becomes conversational (as typically panel discussions are had during this time), the user may wish to experience a frame-based trick-play operation. Therefore, based on the content and the user preferences, for example, the trick-play mode made available for the content item may vary portion by portion as well by individual content items, thereby providing a dynamic variation of trick-play modes, e.g., based on image analysis or content identification, or in some examples, based on an analysis of closed-caption text-timed files.

Figure 6A:
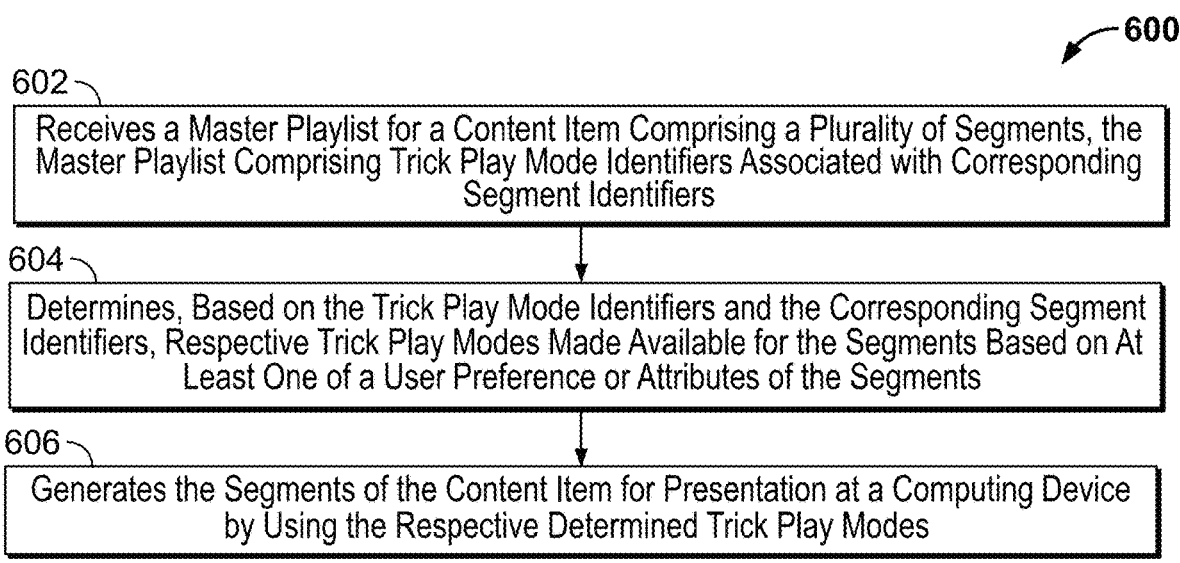
FIG. 6A and FIG. 6B show flowcharts of illustrative steps involved in example methods for enabling user-preferred trick-play modes based on a content item, in accordance with some embodiments of the present disclosure.

FIG. 6A shows a flowchart of illustrative steps involved in an example method for enabling a user-preferred trick-play mode based on a content item, in accordance with some embodiments of the present disclosure. In addition, one or more steps of process 600 may be incorporated into or combined with one or more steps of any other process or embodiment disclosed herein.

At step 602, a computing device receives a master playlist for a content item comprising a plurality of segments. In example embodiments, the master playlist comprises trick-play mode identifiers associated with corresponding segment identifiers for the content item.

At step 604, the computing device determines, based on the trick-play mode identifiers and the corresponding segment identifiers, respective trick-play modes made available for the segments based on at least one of a user preference or attributes of the segments.

At step 606, the computing device generates the segments of the content item for presentation by using the respective determined trick-play modes.

Figure 6B:
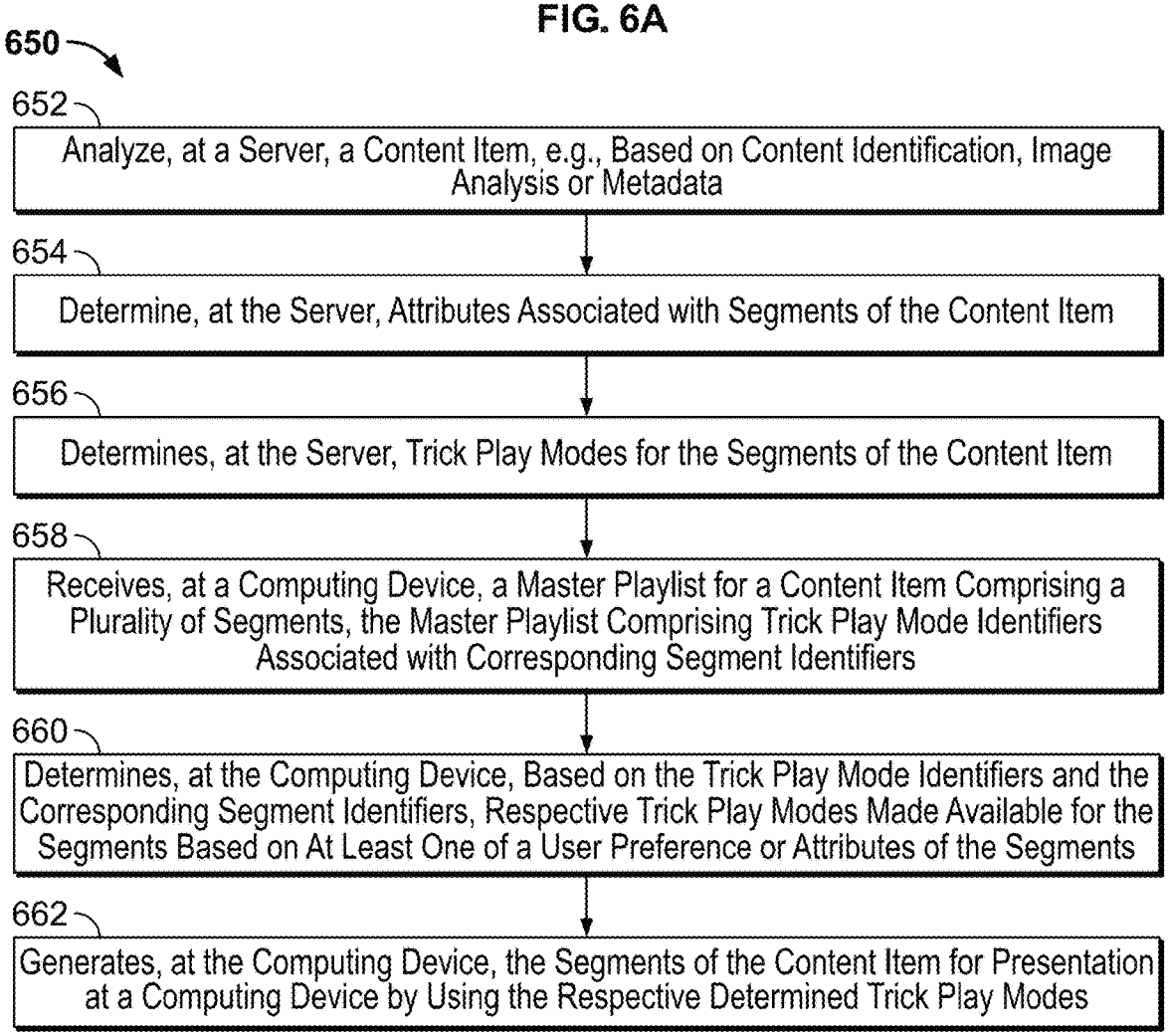

FIG. 6B shows a flowchart of illustrative steps involved in a further example method for enabling a user-preferred trick-play mode based on a content item, in accordance with some embodiments of the present disclosure. In addition, one or more steps of process 650 may be incorporated into or combined with one or more steps of any other process or embodiment disclosed herein.

In some embodiments, the determination of the trick-play mode suitable for the content item/each segment (based on classification and user preference) may be carried out before the master playlist is received at the client device. More particularly, in some embodiments, the process of creating and/or updating the manifest or master playlist may be implemented on the server-side of the system. The master playlist may be received at the user device from the server with appropriate signaling indicating which trick-play modes are available for the user for a particular content item. Alternatively, in some embodiments, the received manifest may indicate trick-play modes available for segments of a content item and the client device may select, for each segment of the content item, based at least in part upon the trick-play modes available for the segment and a user preference, a trick-play mode.

At step 652, a server analyzes a content item, e.g., based on content identification, image analysis or metadata. At step 654, the server determines attributes associated with segments of the content item, e.g., based on the content analysis. For example, the content attributes may be associated with the genre, topic, length, and/or parental rating of the content item. In some embodiments, the server may determine, for a content item comprising a plurality of segments, attributes, such as a content classification, associated with each of the segments.

At step 656, the server determines trick-play modes for the segments of the content item. For example, the trick-play modes may be determined based at least on the content classification and/or a user preference. In some embodiments, determining the one or more trick-play modes for each of the one or more segments may comprise determining the same trick-play mode for all of the segments; determining a plurality of trick-play modes for each segment, for example, based on different bitrate variants of the master playlist; determining a different trick-play mode for each segment of the content item; and/or determining one trick-play mode for the full content item, based on attributes of the content item or segments of the content item.

Accordingly, in some embodiments, the trick-play mode(s) may be determined at the manifest level (i.e., determining the trick-play mode for the whole content item as illustrated in FIG. 4) or at a segment level (i.e., determining trick-play modes for each segment of the content item as illustrated in FIG. 5).

At step 658, a computing device receives a master playlist for a content item comprising a plurality of segments. In example embodiments, the master playlist comprises trick-play mode identifiers associated with corresponding segment identifiers for the content item.

At step 660, the computing device determines, based on the trick-play mode identifiers and the corresponding segment identifiers, respective trick-play modes made available for the segments based on at least one of a user preference or attributes of the segments.

At step 662, the computing device generates the segments of the content item for presentation by using the respective determined trick-play modes. In example embodiments, implementing the trick-play mode and carrying out, upon user request, a trick-play operation in the trick-play mode for particular segments of the content item may be performed at the client/user device.

The processes of FIG. 6A and FIG. 6B may be used with any other embodiments of this disclosure. In addition, the processes described in relation to FIG. 6A and FIG. 6B may be carried out in suitable alternative orders or in parallel to further the purposes of this disclosure.

Figure 7:
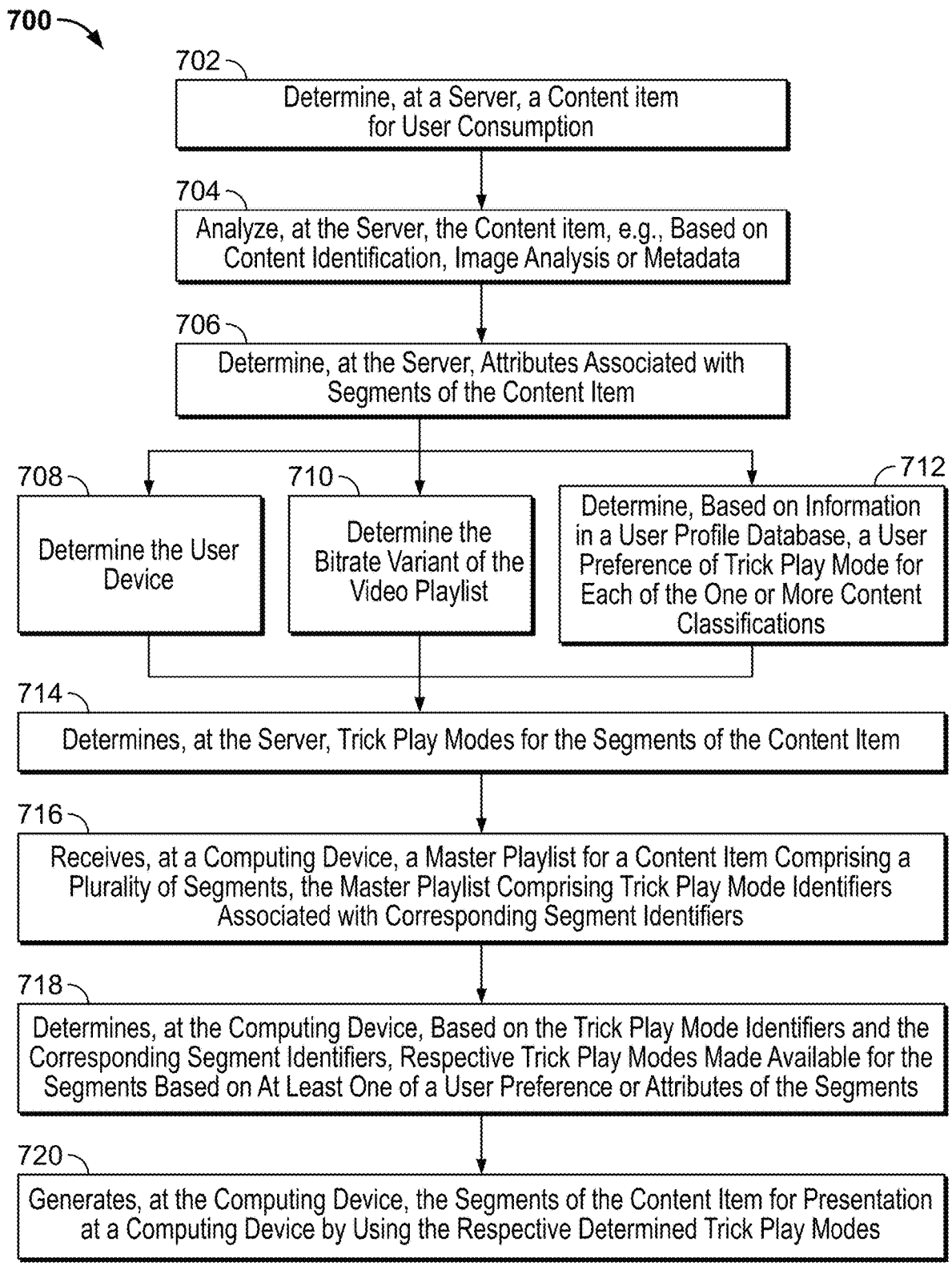
FIG. 7 shows a flowchart of illustrative steps involved in a further example method for enabling user-preferred trick-play modes based on a content item, in accordance with some embodiments of the present disclosure.

FIG. 7 shows a flowchart of illustrative steps involved in yet a further example method for enabling a user-preferred trick-play mode based on a content item, in accordance with some embodiments of the present disclosure. In addition, one or more steps of process 700 may be incorporated into or combined with one or more steps of any other process or embodiment disclosed herein.

At step 702, the server determines a content item for user consumption. For example, the server may identify the content item for user consumption based on the user's scheduling of the content item or determine the content item upon the user's request to play the content item on his/her computing device.

At step 704, a server analyzes a content item, e.g., based on content identification, image analysis or metadata. At step 706, the server determines attributes associated with segments of the content item, e.g., based on the content analysis. For example, the content attributes may be associated with the genre, topic, length, and/or parental rating of the content item. In some embodiments, the server may determine, for a content item comprising a plurality of segments, attributes, such as a content classification, associated with each of the segments.

At step 708, the server may determine the computing device used for consuming the content item. For example, the screen size or the type of computing device may be determined. At step 710, the server may, additionally or alternatively, determine the bitrate variant of the master playlist. For example, the bitrate variant of the video playlist within the master playlist may be determined. At step 712, the server may, additionally or alternatively, determine, based on information in a user profile database, for example, a user preference of trick-play mode associated with specific content attributes.

At step 714, the server determines trick-play modes for the segments of the content item. For example, the trick-play modes may be determined based at least the content classification and/or a user preference and, additionally, any one or more of the factors determined at steps 708, 710, and 712, for example.

At step 716, a computing device receives a master playlist for a content item comprising a plurality of segments. In example embodiments, the master playlist comprises trick-play mode identifiers associated with corresponding segment identifiers for the content item.

At step 718, the computing device determines, based on the trick-play mode identifiers and the corresponding segment identifiers, respective trick-play modes made available for the segments based on at least one of a user preference or attributes of the segments.

At step 720, the computing device generates the segments of the content item for presentation by using the respective determined trick-play modes. In example embodiments, implementing the trick-play mode and carrying out, upon user request, a trick-play operation in the trick-play mode for particular segments of the content item may be performed at the client/user device.

The process of FIG. 7 may be used with any other embodiments of this disclosure. In addition, the process described in relation to FIG. 7 may be carried out in suitable alternative orders or in parallel to further the purposes of this disclosure.

Currently, well-defined requirements for trick-play modes are available, e.g., HLS, DASH, etc. For example, HLS requires content authors to use I-frame playlists for scrubbing. Also, the use of dedicated I-frame renditions such as 1 frame/second dense I-frame renditions may be recommended as opposed to using the I-frames from the actual content item, as higher density provides better performance for trick mode. Furthermore, the use of multiple I-frame playlists with different bitrate variants may also be implemented in conventional systems. These are automatically generated during content pre-processing.

In view of the foregoing, enhanced trick-play modes are disclosed herein that provide viewers feedback in various forms, e.g., audio description, textual description, and haptic feedback. The enhanced trick-play modes described herein may seek to further personalize the trick mode experience for users based on their viewing preferences and may be applied to any of the processes described herein.

Figure 8A:
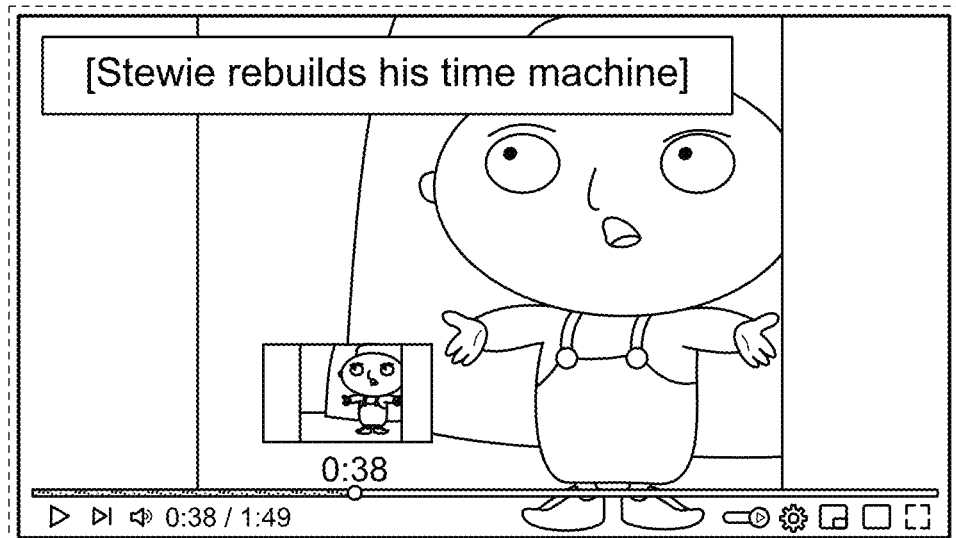
FIG. 8A shows an example trick-play mode providing a textual description for the user during a trick-play operation, in accordance with some embodiments of the present disclosure.
Figure 8B:
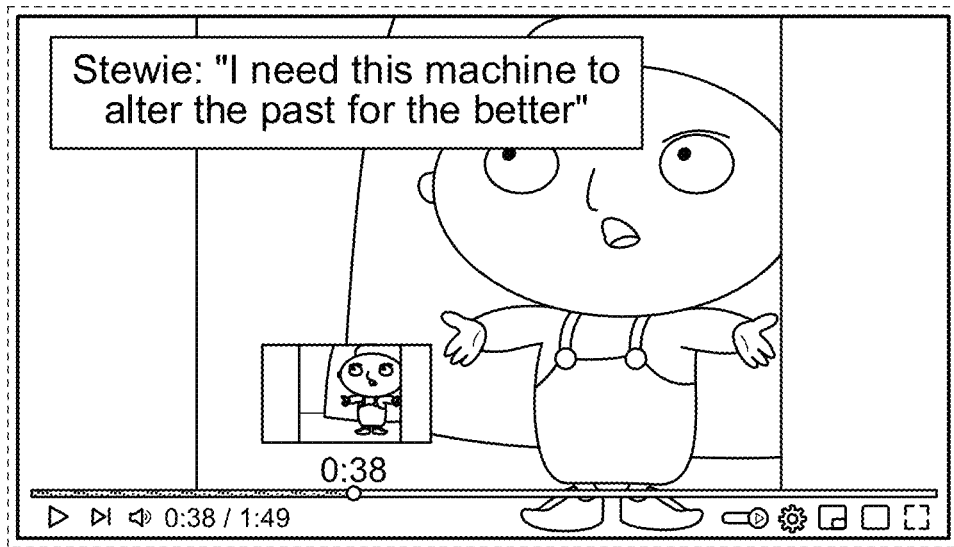
FIG. 8B shows an example trick-play mode providing an audio description for the user during a trick-play operation, in accordance with some embodiments of the present disclosure.

FIG. 8A and FIG. 8B show an example of playback of a segment of a content item during trick-play operation, in accordance with some embodiments of the present disclosure. More particularly, FIG. 8A shows an example trick-play mode providing a textual description for the user during a trick-play operation, in accordance with some embodiments of the present disclosure, and FIG. 8B shows an example trick-play mode providing an audio description for the user during a trick-play operation, in accordance with some embodiments of the present disclosure.

For example, the user is watching "Family Guy" on his/her user device or computing device. The user device includes both a video output device (e.g., an integrated screen or a port through which video data can be sent to an external display) and an audio output device (e.g., one or more integrated speakers or a port through which audio data can be sent to an external speaker or headphones). Video and audio of "Family Guy" are thus output by the user device. The user device may also receive commands from a user input device or user interface (e.g., touchscreen user interface). The media device may receive a command from the user to initiate a trick-play operation in a trick-play mode, e.g., based on a determined trick-play mode identifier. In some embodiments, when performing the requested trick-play operation, a visual playback status indicator may indicate that a trick-play operation is currently being executed. During the trick-play operation, the user device or server may identify one or more segments that will be subjected to the trick-play operation and plays back an audio portion or audio description at normal speed, or displays a textual description or a still image associated with the one or more segments of the content item being subjected to the trick-play operation.

In some embodiments, the user device may display a textual description of the content item, e.g., a portion of timed-text data or a textual description summarizing the segments of the content item subjected to the trick-play operation. For example, the user device may display the textual description based on the significance or importance of each segment of the content item subjected to trick-play operation, e.g., based on content identification and knowledge of timed-text data. For example, the user device may access metadata of the content item being displayed on the user device, which describes the content item, e.g., timed-text data, and, based on textual or any other form of analysis, determine each segment's importance with respect to the content item.

For example, as the user commands a fast-forwarding operation, in thumbnail-based trick-play mode, through a content item, the text description may be displayed above the low-resolution thumbnails. In some embodiments, the textual description may include a summary associated with the low-resolution thumbnails displayed during the trick-play operation. For example, one or more topics may be associated with segments of the content item subjected to trick-play operation, e.g., a group of low resolution frames (typically 1 frame/second). Therefore, the trick-play operation may be titled for the group of low resolution frames with the topic or provided with textual description of the segments subjected to the trick-play operation.

For example, in a scene of "Family Guy" in which Stewie Griffin and Brian Griffin discuss Stewie's plan to go back in time using the time travel machine that Stewie has rebuilt, Stewie tells Brian that "I need this machine to alter the past for the better." The user device may determine a suitable description or summary of the scene, such as "Stewie has rebuilt his time machine" because of its significance to the segment of the particular episode of "Family Guy." The user device may therefore display the textual description or summary associated with the segment of significance while continuing to play back the video at the speed of the trick-play operation.

In some examples, the description could also be in the form of audio, e.g., representing a character's voice, which may be pre-recorded or segmented from the content item, that outputs, e.g., via the output circuitry, an audio description or summary of the segments subjected to the trick-play operation. In some embodiments, the user device may play back a clip of the content item, e.g., with audio at normal speed. For example, the user device may select which clips or portions of audio to play back at normal speed based on the significance or importance of each portion. For example, the user device or server may access metadata of the content item being displayed on the user device, which describes the audio content, e.g., timed-text data, and, based on textual or any other form of analysis, determine each segment's importance with respect to the content item. In some embodiments, in order to enable the audio description feature, audio segments associated with I-frame playlists may be represented in their own playlist. In some embodiments, the same audio description playlist may be associated with all bitrate variants of the video playlist within the master playlist, for example.

For example, in the scene of "Family Guy" in which Stewie Griffin and Brian Griffin discuss Stewie's plan to go back in time using the time travel machine that Stewie has rebuilt, Stewie tells Brian that "I need this machine to alter the past for the better." Metadata describing the portions of audio, e.g., dialogue, in this particular scene may identify the quote "I need this machine to alter the past for the better" as important because of its significance to the segment of the particular episode of "Family Guy." Accordingly, the user device may play back the audio associated with the segment of significance at normal speed while continuing to play back the video at the speed of the trick-play operation.

In some embodiments, the user device may display one or more images depicting the segments of the content item associated with the content item. For example, the system may generate for presentation, at the user device, an image of the main character present in the segments or scenes of the content item subject to trick-play operation. For example, the image of the main character in the scene may be shown alongside the audio description and/or the textual description of the segments of the content item subject to the trick-play operation. In some embodiments, an animation of images depicting the segments of the content item may be generated for display upon determining that the volume output is low (or the audio playout occurs on the physical remote or app-based remote), for example, to indicate the topic/segment/scene change to the user. For example, the new topic/segment/scene as well the image of the main character associated with the new topic/segment/scene may be displayed on the visual display of the user device for the user.

FIG. 9A illustrates a depiction 900 of a timeline of segments of a content item and a moving window encompassing segments that will be subjected to a trick-play operation, in accordance with some embodiments of the present disclosure. FIG. 9B shows an example of metadata describing segments of the content item of FIG. 9A, and FIG. 9C shows another example of metadata describing segments of the content item and user preference data, in accordance with some embodiments of the present disclosure.

FIG. 9A shows a timeline 900 of segments 904, 906, 908, 910 of a content item and a moving window 912 encompassing segments that will be subjected to a trick-play operation, in accordance with some embodiments of the present disclosure. For example, the media device may receive a trick-play command at a current playback position 3 as shown on timeline 902. The media device may initialize the moving window 912 to begin at position 3 of timeline 902. The trick-play operation may be to increase the playback speed of the portion of the content item at an increased speed, e.g., 2× normal speed. The media device may then determine the moving window to terminate at position 13 on timeline 902 automatically or upon manual request, indicating a moving window duration of 10 seconds, for example.

The media device may determine whether the importance of any of the audio description, textual description or a still image of one of the image frames or of one or more characters of the content item exceeds a threshold of importance and, if so, selects that audio description, textual description or still image for playback at normal speed or for display. As the trick-play operation continues, the moving window 912 may be advanced at a speed corresponding to the increased/decreased speed indicated by the trick-play operation, and the importance of additional audio descriptions, textual descriptions or still images may be determined as segments, e.g., segments 906, 908, 910, fall within the scope of the moving window 912. As will be appreciated, the moving window 912 may be adjusted for a reaction time between receipt of a command to resume playback at normal speed and the actual resumption of playback at normal speed. In the case of audio description, the audio description may be played back at a speed that is faster/slower than normal playback speed but slower/faster than the speed at which the trick-play operation is carried out, e.g., 1.05× audio playback speed for a trick-play operation being a fast-forward operation of 2× normal speed.

FIG. 9B shows an example of metadata 920 describing segments of a content item, in accordance with some embodiments of the disclosure. Metadata 920 may include timing information 922 describing the start and end time of each segment of the content item, and importance information 924 with an importance level of the segment of the content item. For example, metadata 926 describes the segment of content item 904, which begins at position 2 and ends at position 5 on timeline 902, and has an importance level of 5. Metadata 928, 930, and 932 similarly describe segments 906, 908, and 910 of the content item, respectively.

In some embodiments, the metadata may include additional information about each segment of the content item. FIG. 9C shows one such example of metadata 940 describing segments of a content item as well as user preference data 960, in accordance with some embodiments of the disclosure. Metadata 940 also includes character information 942 identifying a character featured in each portion of the audio. User preference data 960, as shown in FIG. 9C, includes data for each character 962 and corresponding user preference factors 964. The media device may use the character information 942 in conjunction with user preference data 960, indicating a user preference level for particular characters, to determine an importance level for the segment of the content item.

To identify segments of the content item that will be subjected to the trick-play operation, the user device may initialize a moving window having a starting point at the current playback position. In some embodiments, the trick-play operation may have a length corresponding to the minimum duration of the trick-play operation. The minimum duration may be determined based on the increased/decreased playback speed to be used in the trick-play operation and the average amount of time a user is expected to want to execute the fast-forward command. For example, if the fast-forward operation increases the playback speed to 2x speed and the user is expected to fast-forward for 10 seconds, the media device may initialize the moving window with a length of 20 seconds. In some embodiments, the trick-play operation may have a length corresponding to the duration from when the user initiates the trick-play operation to when the user terminates the trick-play operation.

Figure 10:
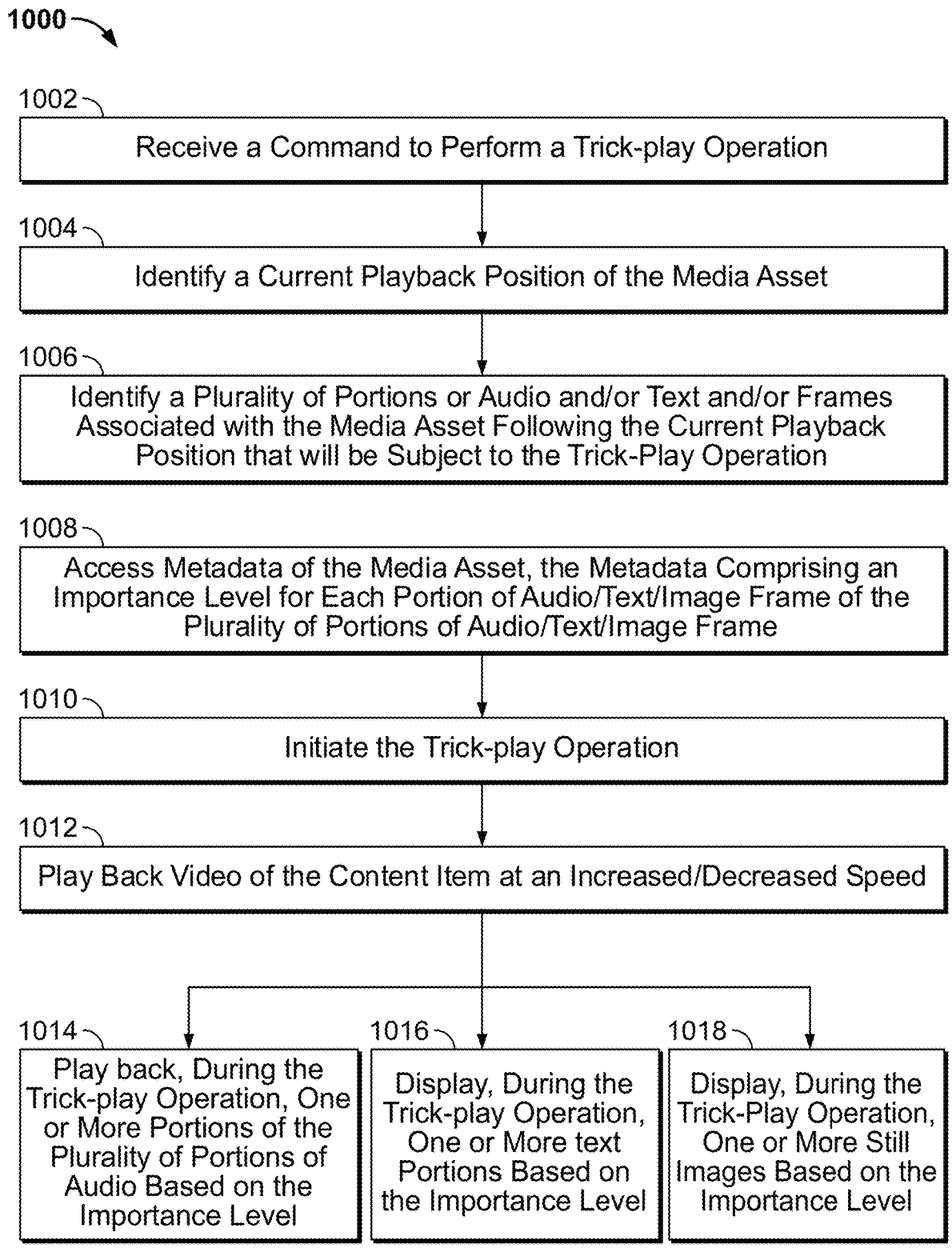
FIG. 10 shows a flowchart representing an illustrative process for selectively playing back or displaying a portion of the content item during a trick-play operation, in accordance with some embodiments of the disclosure.

FIG. 10 shows a flowchart representing an illustrative process for selectively playing back or displaying a portion of the content item during a trick-play operation, in accordance with some embodiments of the disclosure. In addition, one or more steps of process 1000 may be incorporated into or combined with one or more steps of any other process or embodiment disclosed herein.

At 1002, the system receives, e.g., using input circuitry, a command to perform a trick-play operation. The command may be received from a remote control, a user interface or other user input device, or may be a voice command, for example.

At 1004, the system identifies a current playback position of the content item. For example, the control circuitry may access a timestamp of an image frame of the video content currently being displayed.

At 1006, the system identifies a plurality of portions of audio/text/images associated with the content item following the current playback position that will be subject to the trick-play operation. For example, the control circuitry may access, e.g., using transceiver circuitry, metadata of the content item describing segments of the content item subject to trick-play operation. The system may determine, based on the current playback position, which segments of the content item will be subject to the fast-forward operation. At 1008, the system may access metadata of the content item comprising an importance level of each portion of audio/textual description/images of segments of the content item that will be subjected to the fast-forward operation.

At 1010, the system initiates the trick-play operation, e.g., thumbnail-based trick-play operation, upon user request. At 1012, the system, e.g., using output circuitry, plays back video of the content item at an increased or decreased speed, as requested based on the user-commanded trick-play operation.

Upon playback of the video of the content item during the trick-play operation, at step 1014, the system may playback one or more portions of the plurality of portions of audio based on the importance level. Additionally or alternatively, at step 1016, the system may display, during the trick-play operation, one or more text portions, e.g., portions of closed-caption text or a textual description summarizing the segments of the content item subject to the trick-play operation, based on the importance level. Additionally or alternatively, at step 1018, the system may display, during the trick-play operation, one or more still images, e.g., image frames of the video playlist or any other still image depicting the segments of the content item subject to the trick-play operation, such as images of the characters present in the segments of the content item, based on the importance level.

The process of FIG. 10 may be used with any other embodiments of this disclosure. In addition, the process described in relation to FIG. 10 may be carried out in suitable alternative orders or in parallel to further the purposes of this disclosure.

In some embodiments, the user may navigate through the content item, e.g., using the time-progress bar displayed with respect to the content item being consumed by the user. In some embodiments, when the user ends the navigation, in order to resume playback in normal speed, a predetermined number of image frames or segments that precede the current I-frame, if I-frames are used to begin playback, or current playback position, may be played at a faster or slower rate (any rate that's faster or slower than the normal playback speed) as a transition into the frame/scene indicated by the user. For example, the transition may play back the content item from 5 seconds before the playback position the user has requested playback in normal speed, in order to allow the user to transition from previous scenes to the current scene or to transition from trick-play operation to normal operation. In some embodiments, the transition time may be a predetermined time, for example.

In some embodiments, haptic feedback may be generated by the remote control or the user device in order to indicate scene changes within the content item during the playback of segments during trick-play operation. In some embodiments, the characteristic of the feedback may differ or change based on the content classification of each segment of the content item. For example, fast-forwarding through an action scene may generate a strong vibration or multiple consecutive pulses of vibration. Such haptic signals may be communicated to the media player local to the remote or from a server, e.g., in the case when an application on a phone is being used for navigation.

The processes discussed herein are intended to be illustrative and not limiting. One skilled in the art would appreciate that one or more steps associated with the processes discussed herein may be omitted, modified, combined, and/or rearranged, and any additional steps may be performed without departing from the scope of the invention. More generally, the above disclosure is meant to be exemplary and not limiting.

Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in realtime.

It will be appreciated that the media guidance application may perform one or more of the functions described above simultaneously. It should also be noted, the systems and/or methods described above may be applied to, or used in accordance with, other systems and/or methods. Additionally, any of the steps in said processes can be performed in any order, can be omitted, and/or can be combined with any of the steps from any other process.

While some portions of this disclosure may make reference to "convention," any such reference is merely for the purpose of providing context to the invention(s) of the instant disclosure and does not form any admission as to what constitutes the state of the art.

What is claimed is:

1. A method for presenting a content item using one or more trick-play modes, the method comprising:
    receiving a master playlist for a content item comprising a plurality of segments, the master playlist comprising trick-play mode identifiers, wherein each respective trick-play mode identifier identifies one or more trick-play modes that are available for each respective segment of the plurality of segments, wherein the one or more trick-play modes comprise at least two of a set of two or more trick-play modes, the set of trick-play modes comprising seek-based trick-play mode, hop-based trick-play mode, frame-based trick-play mode, and thumbnail-based trick-play mode;
    determining, based on the trick-play mode identifiers and the corresponding segment identifiers, respective trick-play modes made available for the segments based on at least one of a user preference or attributes of the segments; and
    generating the segments of the content item for presentation at a computing device by using one of the set of trick play modes for a first segment and a different one of the set of trick play modes for a second segment in accordance with the respective determined trick-play modes for the first and second segments.

2. The method of claim 1, wherein the respective trick-play modes are made available for the segments further based on metadata associated with the content item.

3. The method of claim 2, wherein the metadata associated with the content item comprises timed-text data.

4. The method of claim 1, wherein the trick-play mode identifiers are made available for the segments further based on the computing device.

5. The method of claim 1, wherein the user preference is determined based on user profile information.

6. The method of claim 1, wherein the master playlist comprises at least a video playlist comprising one or more bitrate variants, further wherein the one or more bitrate variants comprise the segment identifiers for the plurality of segments of the content item.

7. The method of claim 6, wherein the respective trick-play modes are made available for the segments further based on the one or more bitrate variants of the video playlist.

8. The method of claim 1, wherein the attributes of the segments are associated with any one or a combination of: genre; topic; length; and/or parental rating.

9. A system for presenting a content item using one or more trick-play modes, the system comprising:
    input circuitry configured to receive a command for performing trick-play operations; and
    control circuitry configured to:
        receive a master playlist for a content item comprising a plurality of segments, the master playlist comprising trick-play mode identifiers associated with corresponding segment identifiers, wherein each respective trick-play mode identifier identifies one or more trick-play modes that are available for each respective segment of the plurality of segments, wherein the one or more trick-play modes comprise at least two of a set of two or more trick-play modes, the set of trick-play modes comprising seek-based trick-play mode, hop-based trick-play mode, frame-based trick-play mode, and thumbnail-based trick-play mode;
        determine, based on the trick-play mode identifiers and the corresponding segment identifiers, respective trick-play modes made available for the segments based on at least one of a user preference or attributes of the segments; and
        generate the segments of the content item for presentation at a computing device by using one of the set of trick play modes for a first segment and a different one of the set of trick play modes for a second segment in accordance with the respective determined trick-play modes for the first and second segments.

10. The system of claim 9, wherein the respective trick-play modes are made available for the segments further based on metadata associated with the content item.

11. The system of claim 10, wherein the metadata associated with the content item comprises timed-text data.

12. The system of claim 9, wherein the trick-play mode identifiers are made available for the segments further based on the computing device.

13. The system of claim 9, wherein the user preference is determined based on user profile information.

14. The system of claim 9, wherein the master playlist comprises at least a video playlist comprising one or more bitrate variants, further wherein the one or more bitrate variants comprise the segment identifiers for the plurality of segments of the content item.

15. The system of claim 14, wherein the respective trick-play modes are made available for the segments further based on the one or more bitrate variants of the video playlist.

16. The system of claim 9, wherein the attributes of the segments are associated with any one or a combination of: genre; topic; length; and/or parental rating.

17. A non-transitory computer-readable medium having instructions encoded thereon for carrying out a method, the method comprising:
    receiving a master playlist for a content item comprising a plurality of segments, the master playlist comprising trick-play mode identifiers associated with corresponding segment identifiers, wherein each respective trick-play mode identifier identifies one or more trick-play modes that are available for each respective segment of the plurality of segments, wherein the one or more trick-play modes comprise at least two of a set of two or more trick-play modes, the set of trick-play modes comprising seek-based trick-play mode, hop-based trick-play mode, frame-based trick-play mode, and thumbnail-based trick-play mode;
    determining, based on the trick-play mode identifiers and the corresponding segment identifiers, respective trick-play modes made available for the segments based on at least one of a user preference or attributes of the segments; and
    generating the segments of the content item for presentation at a computing device by using one of the set of trick play modes for a first segment and a different one of the set of trick play modes for a second segment in accordance with the respective determined trick-play modes for the first and second segments.

\* \* \* \* \*